United States Patent
Liao et al.

(10) Patent No.: US 12,449,576 B2
(45) Date of Patent: Oct. 21, 2025

(54) COLOR DISPLAY DEVICE AND COLOR FILTER ARRAY SUBSTRATE

(71) Applicant: E Ink Holdings Inc., Hsinchu (TW)

(72) Inventors: Ching-Huan Liao, Hsinchu (TW); Yi-Yu Tsai, Hsinchu (TW); Hsin-Tao Huang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 514 days.

(21) Appl. No.: 17/951,028

(22) Filed: Sep. 22, 2022

(65) Prior Publication Data

US 2023/0194761 A1    Jun. 22, 2023

(30) Foreign Application Priority Data

Dec. 16, 2021  (TW) .................................. 110147082

(51) Int. Cl.
*G02B 5/20* (2006.01)
*G02F 1/167* (2019.01)

(52) U.S. Cl.
CPC ............ *G02B 5/201* (2013.01); *G02F 1/167* (2013.01)

(58) Field of Classification Search
CPC ........... G02B 5/201; G02B 5/22; G02F 1/167; G02F 1/133514; G02F 1/1677
See application file for complete search history.

(56) References Cited

U.S. PATENT DOCUMENTS

| | | |
|---|---|---|
| 9,645,436 B2 | 5/2017 | Chen et al. |
| 10,013,930 B2 | 7/2018 | Sakaigawa et al. |
| 2007/0063946 A1* | 3/2007 | Nakamura ........ G02F 1/133514 345/88 |
| 2008/0137168 A1* | 6/2008 | Abe ..................... G02F 1/13473 359/273 |
| 2012/0212515 A1* | 8/2012 | Hamer ................ G09G 3/3225 345/77 |

FOREIGN PATENT DOCUMENTS

| | | |
|---|---|---|
| JP | S61102602 | 5/1986 |
| JP | 2003161933 | 6/2003 |
| JP | 2006162706 | 6/2006 |
| JP | 2009265272 | 11/2009 |
| JP | 2012244495 | 12/2012 |
| JP | 2018101050 | 6/2018 |
| TW | 201236002 | 9/2012 |

OTHER PUBLICATIONS

"Office Action of China Counterpart Application", issued on Apr. 27, 2025, p. 1-p. 7.

* cited by examiner

*Primary Examiner* — Charles S Chang
(74) *Attorney, Agent, or Firm* — JCIPRNET

(57) ABSTRACT

A color display device includes a substrate, a pixel structure, a color filter array, and a display medium layer. The pixel structure is deposed on the substrate and includes pixel sub-structures. The color filter array is formed from color materials of different color and deposed above the pixel structure. The color filter array includes filter elements, each of which corresponding to one of the pixel sub-structures. At least some of the filter elements are formed from two kinds of the color materials of different color. The display medium layer is deposed on the pixel structure. A color filter array substrate is also provided.

12 Claims, 5 Drawing Sheets

COLOR DISPLAY DEVICE AND COLOR FILTER ARRAY SUBSTRATE

CROSS-REFERENCE TO RELATED APPLICATION

This application claims the priority benefit of Taiwan application serial no. 110147082, filed on Dec. 16, 2021. The entirety of the above-mentioned patent application is hereby incorporated by reference herein and made a part of this specification.

BACKGROUND

Technology Field

The disclosure relates to a display device, and particularly, to a color display device and a color filter array substrate.

Description of Related Art

Display devices have become more and more concerned about the presentation of colors with the advancement and popularization of display technology. In the display technology, to achieve the effect of color display, a color filter layer is usually added between the display medium layer and the front light module. For example, a semiconductor photolithography process is adopted to attach the color ink material to the glass substrate and then the glass substrate is bonded to the display medium layer, or the color ink material is directly printed on the display medium layer by spraying.

Red, green, blue (RGB) are commonly used color inks. FIG. 1 illustrates the transmittance spectrum of the conventional red, green, and blue ink materials at each wavelength of visible light. Referring to FIG. 1, when the light passes through the raw material red ink R, only the wave band of red light can pass through, and the same principle can be applied to the raw material green ink G and the raw material blue ink B. If two kinds of color inks are overlapped in a light path, most of the light in the visible light band cannot penetrate and appears approximately black. This is the principle of light subtractive color mixing. If RGB three-color inks are used to achieve a color mixing effect, such as cyan, magenta, or yellow, the two kinds of color inks may be disposed adjacent to each other to mix the light. For example, the raw material red ink R and the raw material green ink G are disposed adjacent to each other to emit red light and green light respectively. The thin-film transistor (TFT) controls the adjacent pixels to be turned on at the same time to display yellow light. Accordingly, green light and blue light can be mixed into cyan light, and red light and blue light can be mixed into magenta light. Red light, green light, and blue light are turned on at the same time and can be mixed into white light.

However, in the current field, choices of materials are limited since red, green, and blue ink materials with better optical or color rendering effects are often expensive, while lower-priced materials have unsatisfactory optical or color rendering effects. It is difficult to strike a balance between the color display effect and the manufacturing cost in production. More materials from the three kinds of color ink materials, cyan, magenta, and yellow (CMY) can be chosen and have a cost advantage.

SUMMARY

The disclosure provides a color display device and a color filter array substrate, so there are wide choices of materials when manufacturing a color filter layer, and a balance between the color display effect and the manufacturing cost in production is stricken.

An embodiment of the disclosure provides a color display device including a substrate, a pixel structure, a color filter array, and a display medium layer. The pixel structure is disposed on the substrate and includes multiple pixel sub-structures. The color filter array is formed by multiple color materials of different colors, and the color filter array is disposed above the pixel structure and includes multiple filter elements. Each of the filter elements corresponds to one of the pixel sub-structures, and at least some of the filter elements are formed by two kinds of the color materials of different colors. The display medium layer is disposed on the pixel structure. The color materials of different colors at least include one of a first color material, a second color material, and a third color material. When a wavelength of visible light is a first wavelength, transmittance of visible light in the first colored material is 50%, and the first wavelength is less than or equal to 530 nm.

An embodiment of the disclosure provides a color filter array substrate including a substrate and a color filter array. The color filter array is disposed on the substrate and formed by multiple color materials of different colors. The color filter array includes multiple filter elements, and at least some of the filter elements are formed by two kinds of the color materials of different colors. The color materials of different colors at least include one of a first color material, a second color material, and a third color material. When a wavelength of visible light is a first wavelength, transmittance of the visible light in the first color material is 50%, and the first wavelength is less than or equal to 530 nm. When the wavelength of visible light is greater than 580 nm, the transmittance of the visible light in the first color material is less than 10%.

In the color display device and the color filter array substrate of the embodiments of the disclosure, since each filter element corresponds to a pixel sub-structure, and at least some of the filter elements are formed by two kinds of color materials of different colors, the choices of color materials are not limited to a single red, green, and blue material, but a combination of two materials to absorb the incident light of different wavelengths, respectively. Moreover, because of the transmittance characteristics of the color materials, the corresponding pixel sub-structure can be used to display effects that are close to red, green, and blue. Therefore, there are wide choices of materials when manufacturing a color filter layer, and a balance between the color display effect and the manufacturing cost in production is stricken.

DESCRIPTION OF THE EMBODIMENTS

Figure 2A:
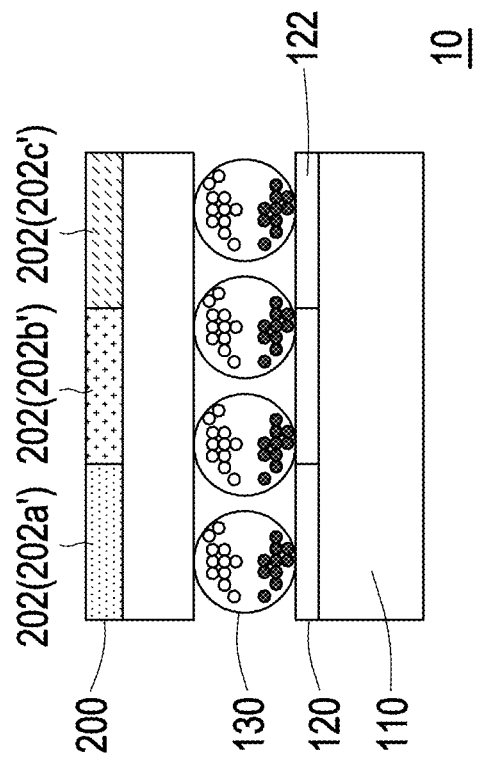
FIG. 2A is a schematic cross-sectional view of a color display device according to an embodiment of the disclosure.

FIG. 2A is a schematic cross-sectional view of a color display device 10 according to an embodiment of the disclosure. Referring to FIG. 2A, the color display device 10 includes a substrate 110, a pixel structure 120, a color filter array 200, and a display medium layer 130. The pixel structure 120 is disposed on the substrate 110 and includes multiple pixel sub-structures 122, and each pixel sub-structure 122 may include a pixel electrode and a switch element (e.g., a transistor), or other electronic elements (e.g., a capacitor). The substrate 110 is a glass substrate, a plastic substrate, a silicon substrate, a printed circuit board, a flexible substrate, or other suitable substrates, for example. The color filter array 200 is formed by multiple color materials of different colors, is disposed above the pixel structure 120, and includes multiple filter elements 202. Each filter element 202 corresponds to a pixel sub-structure 122. At least some of the filter elements 202 are formed by two kinds of the color materials of different colors. The color materials of different colors are three kinds of color materials, for example. In the embodiment, the two kinds of color materials of the filter element 202 including two kinds of the color materials of different colors are disposed in an upper layer and a lower layer, respectively. Such a configuration can ensure that the intensity ratio of the light passing through the two kinds of the color materials is the same. For example, in FIG. 2A, the filter element 202 includes filter elements 202a, 202b, and 202c disposed in a staggered manner. The filter element 202a includes a lower layer of cyan material and an upper layer of magenta material. Therefore, after visible light across the visible light spectrum is incident to the filter element 202, due to the principle of light subtractive mixing, the emitted light may appear blue. The filter element 202b includes a lower layer of magenta material and an upper layer of yellow material. Therefore, after visible light across the visible light spectrum is incident to the filter element 202, due to the principle of light subtractive mixing, the emitted light may appear red. The filter element 202c includes a lower layer of yellow material and an upper layer of cyan material. Therefore, after visible light across the visible light spectrum is incident to the filter element 202, due to the principle of light subtractive mixing, the emitted light may appear green. In an embodiment, the color filter array 200 may be disposed on a substrate to form a color filter array substrate, and the substrate is a transparent substrate, for example.

The display medium layer 130 is disposed on the pixel structure 120. In the embodiment, the display medium layer 130 is an electrophoretic display material layer, so the color display device 10 is a reflective display device. However, in other embodiments, the display medium layer 130 may also be a liquid crystal layer, an organic light-emitting layer, an inorganic light-emitting layer, or other suitable display material layers. A front light module may be also disposed above the color filter array 200 of the color display device 10 according to actual requirements. The front light module includes a solid transparent optical glue, a light guide plate, a touch panel, a protective glass, and the like, for example.

Figure 2B:
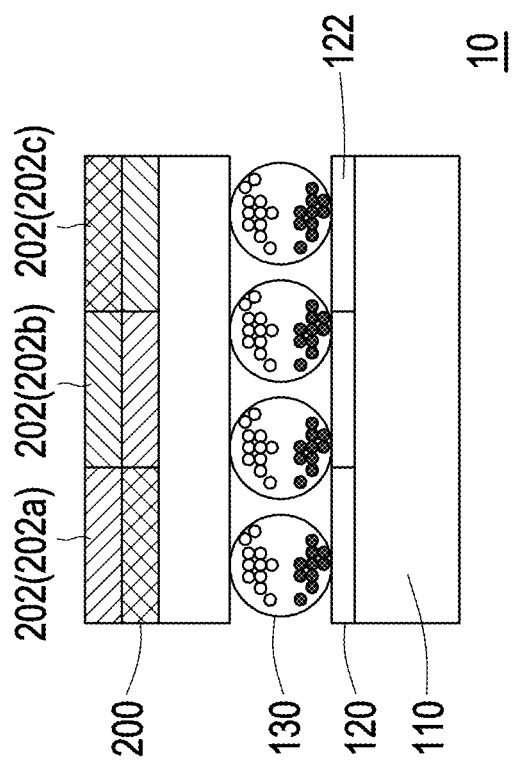
FIG. 2B is a schematic cross-sectional view of a color display device according to another embodiment of the disclosure.

FIG. 2B is a schematic cross-sectional view of the color display device 10 according to another embodiment of the disclosure. What differs from the embodiment of FIG. 2A is that in the embodiment, the two kinds of color materials of the filter element 202 formed by two kinds of the color materials of different colors are randomly mixed and distributed, so that the incident light is randomly collided in the filter element 202 and then is emitted, the effect of uniform color mixing is displayed on the macro view. For example, in FIG. 2B, the filter element 202 includes filter elements 202a', 202b', and 202c' disposed in a staggered manner. The filter element 202a' is formed by randomly mixed yellow and magenta materials. Therefore, after visible light across the visible light spectrum is incident to the filter element 202, due to the principle of light subtractive mixing, the emitted light may appear red. The filter element 202b' is formed by randomly mixed cyan and yellow materials. Therefore, after visible light across the visible light spectrum is incident to the filter element 202, due to the principle of light subtractive mixing, the emitted light may appear green. The filter element 202c' is formed by randomly mixed magenta and cyan materials. Therefore, after visible light across the visible light spectrum is incident to the filter element 202, due to the principle of light subtractive mixing, the emitted light may appear blue.

Figure 3:
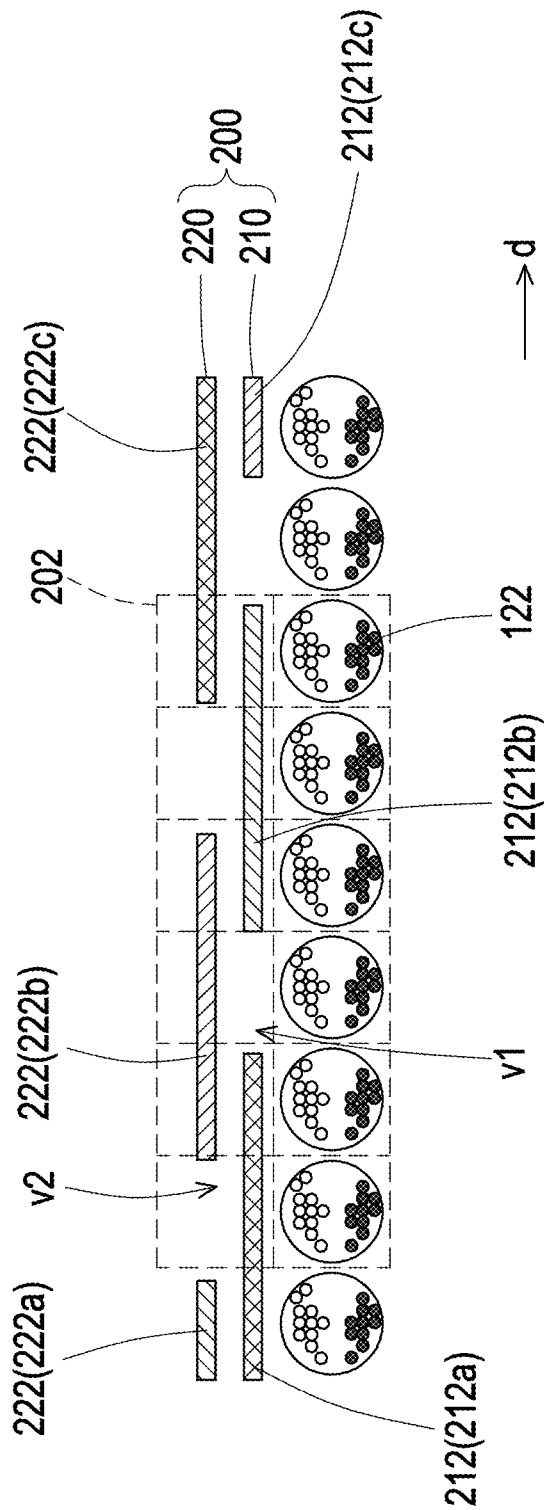
FIG. 3 is a schematic cross-sectional view of some elements of a color display device according to yet another embodiment of the disclosure.

FIG. 3 is a schematic cross-sectional view of some elements of the color display device 10 according to yet another embodiment of the disclosure. Referring to FIG. 3, in the embodiment, the color filter array 200 is formed by a first filter layer 210 and a second filter layer 220 disposed above the first filter layer 210. The first filter layer 210 includes multiple first filter sub-regions 212, the first filter sub-regions 212 are divided into groups of different colors (e.g., three groups, such as a group formed by the first filter sub-regions 212a, a group formed by the first filter sub-regions 212b, and a group formed by the first filter sub-regions 212c), and the first filter sub-regions 212 of each group are formed by one kind of the color materials. For example, the first filter sub-regions 212a are formed by cyan materials, the first filter sub-regions 212b are formed by yellow materials, and the first filter sub-regions 212c are formed by magenta materials, for example. These color materials of different colors are directly disposed on the display medium layer 130, for example.

There is a first interval v1 between two adjacent first filter sub-regions 212 in a direction d in which the pixel sub-structures 122 are disposed, and the first interval v1 corresponds to one pixel sub-structure 122 disposed in the direction d. That is, one pixel sub-structure 122 disposed in the direction d below is exposed between the two adjacent first filter sub-regions 212. For example, in the embodiment, the first filter sub-region 212 is overlapped with the 4n-3th, the 4n-2th, and the 4n-1th pixel sub-structures 122 in the direction d, and the 4nth pixel sub-structure 122 is not overlapped with the first filter sub-region 212.

The second filter layer 220 includes multiple second filter sub-regions 222, the second filter sub-regions 222 are divided into groups of different colors (e.g., three groups, such as a group formed by second filter sub-regions 222a, a group formed by second filter sub-regions 222b, and a group formed by second filter sub-regions 222c), and the second filter sub-regions 222 of each group are formed by one kind of the color materials. For example, the second filter sub-regions 222a are formed by yellow materials, the second filter sub-regions 222b are formed by magenta materials, for example, and the second filter sub-regions 222c are formed by cyan materials, for example.

The second filter sub-region 222 is overlapped with part of the first filter sub-region 212, and there is a second interval v2 between two adjacent second filter sub-regions 222 in the direction d in which the pixel sub-structures 122 are disposed. The second interval v2 corresponds to one pixel sub-structure 122 disposed in the direction d, and the second interval v2 and the first interval v1 are disposed in a staggered manner. In some embodiments, at least some of the filter elements 202 are formed by one of the first filter sub-region 212 or the second filter sub-region 222, and at least some of the filter elements 202 are formed by both the first filter sub-region 212 and the second filter sub-region 222. For example, in the embodiment, the second filter sub-region 222 is overlapped with the 4n-3th, the 4n-1th, and the 4nth pixel sub-structures 122 in the direction d, and the 4n-2th pixel sub-structure 122 is not overlapped with the second filter sub-region 222. That is, the filter element 202 corresponding to the 4n-2th pixel sub-structure 122 includes the first filter sub-region 212, the filter element 202 corresponding to the 4nth pixel sub-structure 122 includes the second filter sub-region 222, and the filter element 202 corresponding to the 4n-3th and 4n-1th pixel sub-structures 122 includes both the first filter sub-region 212 and the second filter sub-region 222.

Specifically, in the embodiment, taking the first to the sixth pixel sub-structures 122 in the direction d as an example, the filter element 202 corresponding to the first pixel sub-structure 122 in the direction d includes the first filter sub-region 212a including a cyan material and the second filter sub-region 222a including a yellow material. Therefore, after visible light across the visible light spectrum is incident to the filter element 202, due to the principle of light subtractive mixing, the emitted light may appear green. Similarly, with the filter element 202 corresponding to the third and the fifth pixel sub-structures 122 in the direction d, the emitted light may appear blue and red, respectively. Moreover, since the filter element 202 corresponding to the second, the fourth, and the sixth pixel sub-structures 122 in the direction d includes a single layer of the first filter sub-region 212 or the second filter sub-region 222, the displayed colors are the colors of the color materials constituting the areas, such as cyan, magenta, and yellow, respectively.

In the embodiment of FIG. 2A to FIG. 3, in the color filter array 200 of the color display device 10, the color materials of different colors include at least one of the first color material C, a second color material M, and a third color material Y. The characteristics of the first color material C, the second color material M, and the third color material Y are as follows. When a wavelength λ of visible light is a first wavelength λ1, the transmittance T of visible light in the first color material C is 50%, and when the wavelength λ of visible light is greater than 580 nm, the transmittance T of visible light in the first color material C is less than 10%. When the wavelength λ of visible light is a second wavelength λ2 or a third wavelength λ3, the transmittance T of visible light in the second color material M is 50%. When the wavelength λ of visible light ranges from 510 nm to 580 nm, the transmittance T of visible light in the second color material M is less than 10%. When the wavelength λ of visible light is a fourth wavelength λ4, the transmittance T of visible light in the third color material Y is 50%, and when the wavelength λ of visible light is less than 460 nm, the transmittance T of visible light in the third color material Y is less than 10%. The first wavelength λ1 is less than or equal to 530 nm, the second wavelength λ2 is less than or equal to 490 nm, the third wavelength λ3 is greater than or equal to 590 nm, and the fourth wavelength λ4 is greater than or equal to 500 nm.

Figure 4A:
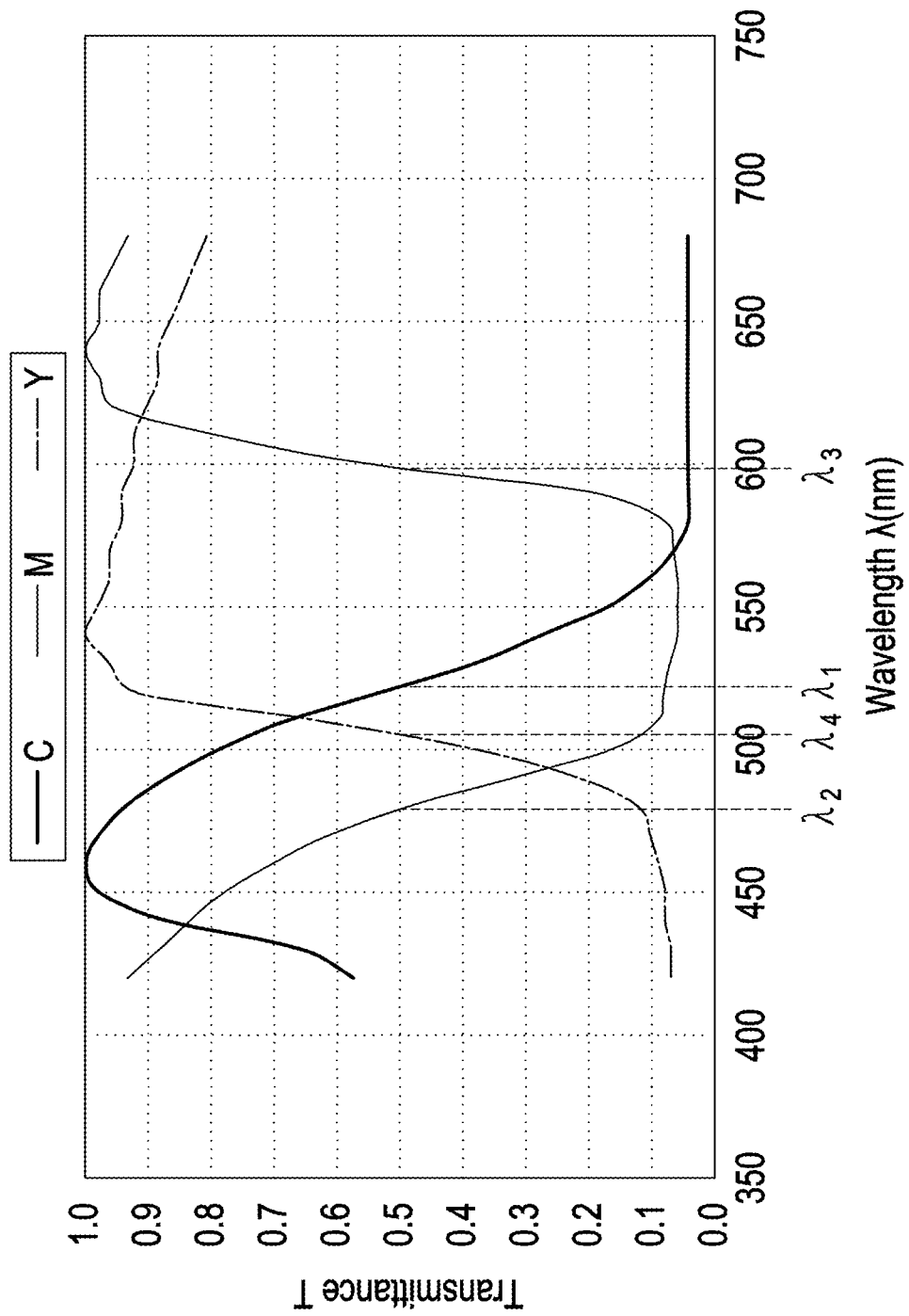
FIG. 4A is a transmittance spectrum of a color material of a color filter array of a color display device according to an embodiment of the disclosure.

FIG. 4A is a transmittance spectrum of a color material of the color filter array 200 of the color display device 10 according to an embodiment of the disclosure at each wavelength λ of visible light. Referring to FIG. 4A, in the embodiment, the first wavelength λ1 is 522 nm, and when the wavelength λ of visible light is greater than 580 nm, the transmittance T of visible light in the first color material C is less than or equal to 4.3%. The second wavelength λ2 is 478 nm, and the third wavelength λ3 is 598 nm. When the wavelength λ of visible light ranges from 510 nm to 580 nm, the transmittance T of visible light in the second color material M is less than or equal to 9.1%. The fourth wavelength λ4 is 505 nm, and when the wavelength λ of visible light is less than 460 nm, the transmittance T of visible light in the third color material Y is less than or equal to 9.0%.

Therefore, the first color material C absorbs most light with a wavelength λ above 580 nm (corresponding to the red light band in the spectrum) and allows the light with a wavelength λ ranging from 400 nm to 580 nm (corresponding to the blue light band and the green light band in the spectrum) to penetrate. The second color material M absorbs most light with a wavelength λ ranging from 510 nm to 580 nm (corresponding to the green light band in the spectrum) and allows the light with wavelength λ ranging from 400 nm to 510 nm and the light with wavelength λ ranging from 580 nm to 680 nm (corresponding to the blue light band and the red light band in the spectrum) to penetrate. The third color material Y absorbs most light with a wavelength λ below 460 nm (corresponding to the blue light band in the spectrum) and allows the light with a wavelength λ ranging from 460 nm to 680 nm (corresponding to the green light band and the red light band in the spectrum) to penetrate. Therefore, the subtractive mixing between any two of the first color material C, the second color material M, and the third color material Y can well simulate the RGB made of the original materials, and the white color can be further mixed by RGB.

For example, the first filter sub-regions 212a, 212b, and 212c in FIG. 3 may include the first color material C, the third color material Y, and the second color material M, respectively. The second filter sub-regions 222a, 222b, and 222c may include the third color material Y, the second color material M, and the first color material C, respectively. Taking the filter element 202 corresponding to the first pixel sub-structure 122 in the direction d as an example, when visible light is incident to the filter element 202, the visible light with the 580-680 nm band passing through the third color material Y is absorbed by the first color material C, and the remaining visible light with the 460-580 nm band can pass through and appear green.

Figure 4B:
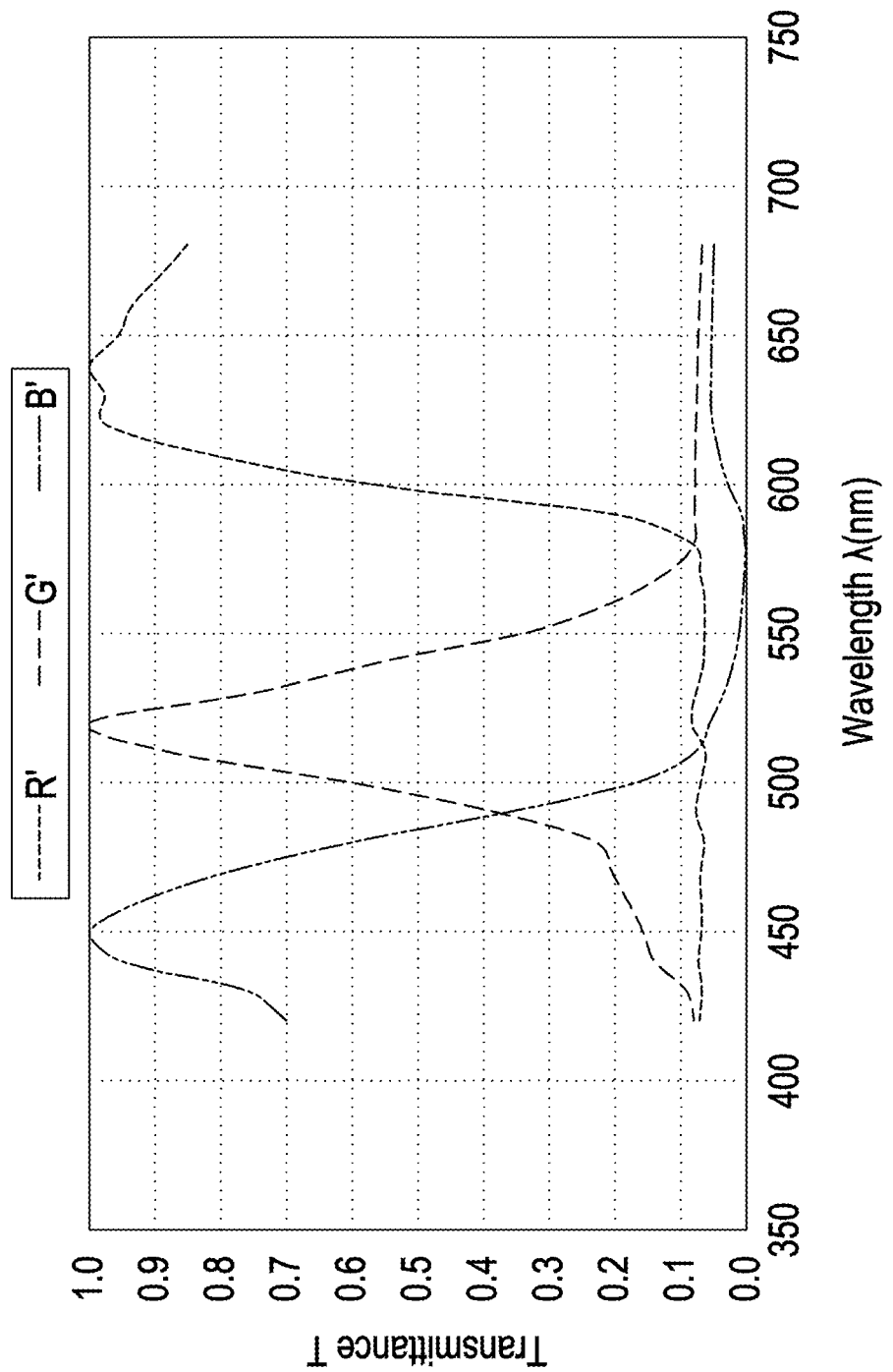
FIG. 4B is a transmittance spectrum of the color material of FIG. 4A after calculation of the transmittance spectrum.

FIG. 4B is a transmittance spectrum of the color material of FIG. 4A after calculation of the transmittance spectrum. Referring to FIG. 4A and FIG. 4B, a red transmittance spectrum R' is a function graph of the function obtained by multiplying and normalizing the transmittance spectrum functions of the second color material M and the third color material Y in FIG. 4A, corresponding to the transmittance spectrums of the second color material M and the third color material Y after being mixed or overlapped. A green transmittance spectrum G' is a function graph of the function obtained by multiplying and normalizing the transmittance spectrum functions of the first color material C and the third color material Y in FIG. 4A, corresponding to the transmittance spectrums of the first color material C and the third color material Y after being mixed or overlapped. A blue transmittance spectrum B' is a function graph of the function obtained by multiplying and normalizing the transmittance spectrum functions of the first color material C and the second color material M in FIG. 4A, corresponding to the transmittance spectrums of the first color material C and the second color material M after being mixed or overlapped.

Figure 1:
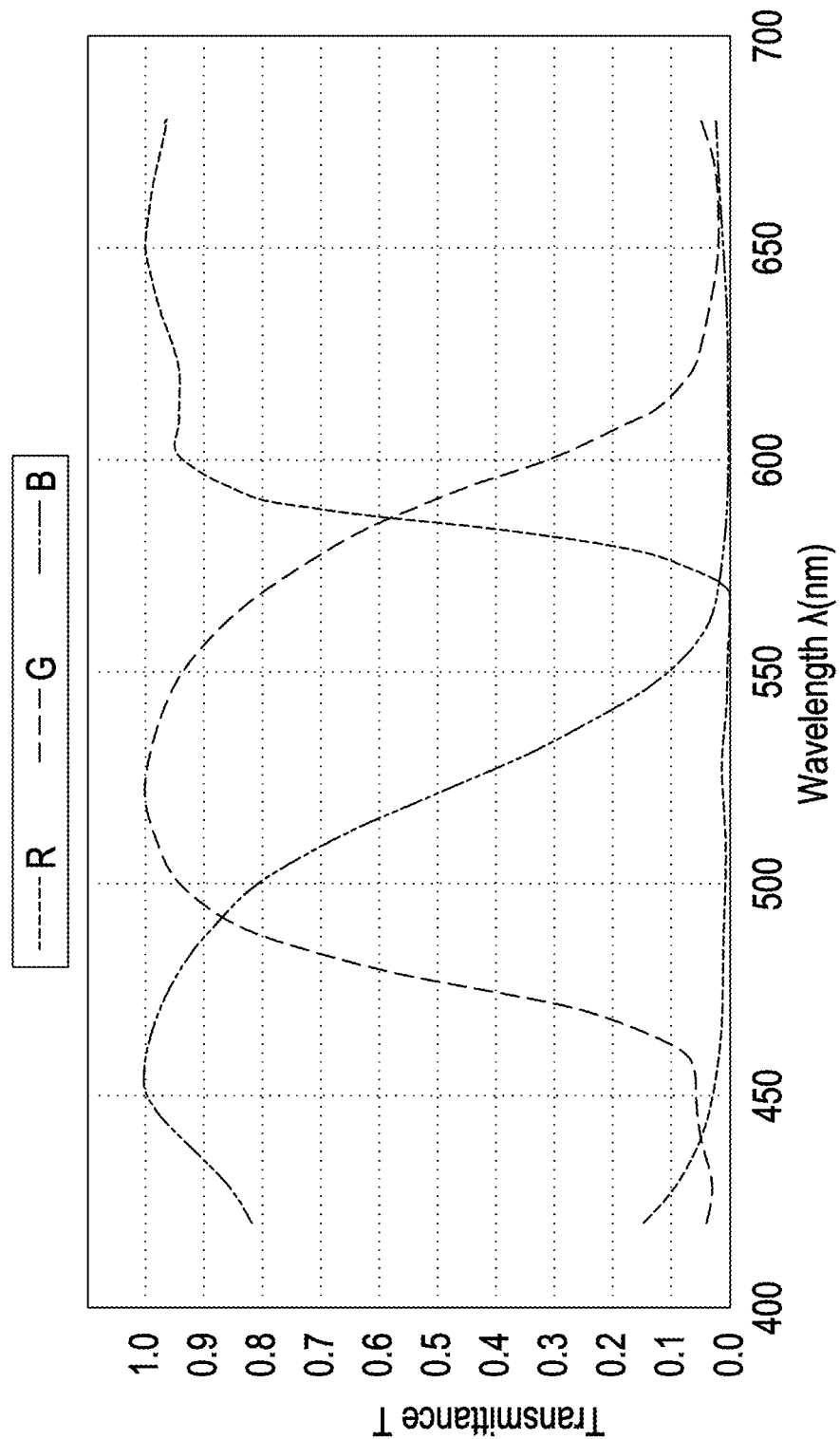
FIG. 1 illustrates the transmittance spectrum of conventional red, green, and blue ink materials at each wavelength of visible light.

The transmittance spectrums of the conventional RGB ink materials at each wavelength λ of visible light shown in FIG. 1 are compared with the red transmittance spectrum R', the green transmittance spectrum G', and the blue transmittance spectrum B' shown in FIG. 4A. It is shown that the red transmittance spectrum R' has the light wavelength λ ranging from 590 nm to 600 nm when the transmittance T is 50%, which is greater than the wavelength λ (about 580 nm) of the original red ink R when the transmittance T is 50%. Moreover, the transmittance T of the raw material red ink R at a wavelength λ less than 560 nm is less than 5%. It is shown that the transmittance T of the red transmittance spectrum R' at a wavelength λ less than 560 nm is less than 10%. Therefore, the second color material M and the third color material Y have better color performance after being mixed or overlapped, which is close to the original red ink R. The full width at half maximum (FWHM) displayed by the green transmittance spectrum G' is less than that of the original green ink G, and at a wavelength λ of 580 nm or more, the transmittance T is less than 10%. Therefore, the first color material C and the third color material Y have better color performance after being mixed or overlapped, which is close to the original green ink G. It is shown that the blue transmittance spectrum B' has the light wavelength λ of about 480 nm when the transmittance T is 50%, which is less than the light wavelength λ (about 520 nm) of the original blue ink B when the transmittance T is 50%. Moreover, the transmittance T of the original blue ink B at a wavelength λ greater than 550 nm is less than 10%, and it is shown that the transmittance T of the blue transmittance spectrum B' at a wavelength λ greater than 510 nm is less than 10%. Therefore, the first color material C and the second color material M have better color performance after being mixed or overlapped, which is close to the original blue ink B.

In summary, in the color display device and the color filter array substrate of the embodiments of the disclosure, since each filter element corresponds to a pixel sub-structure, and at least some of the filter elements are formed by two kinds of color materials of different colors, the choices of color materials are not limited to a single red, green, and blue material, but a combination of two materials to absorb the incident light of different wavelengths, respectively. Moreover, because of the transmittance characteristics of the color materials, the corresponding pixel sub-structure can be used to display effects that are close to red, green, and blue. Therefore, there are wide choices of materials when manufacturing a color filter layer, and a balance between the color display effect and the manufacturing cost in production is stricken.

What is claimed is:

1. A color display device, comprising:
   a substrate;
   a pixel structure disposed on the substrate and comprising a plurality of pixel sub-structures;
   a color filter array formed by a plurality of color materials of different colors, wherein the color filter array is disposed above the pixel structure and comprises a plurality of filter elements, each of the filter elements corresponds to one of the pixel sub-structures, and at least some of the filter elements are formed by two kinds of the color materials of different colors; and
   a display medium layer disposed on the pixel structure,
   wherein, the color materials of different colors at least comprise one of a first color material, a second color material, and a third color material, when a wavelength of visible light is a first wavelength, transmittance of visible light in the first colored material is 50%, and the first wavelength is less than or equal to 530 nm.

2. The color display device according to claim 1, wherein when the wavelength of visible light is greater than 580 nm, the transmittance of visible light in the first color material is less than 10%.

3. The color display device according to claim 1, wherein when the wavelength of visible light is a second wavelength or a third wavelength, transmittance of visible light in the second color material is 50%, the second wavelength is less than or equal to 490 nm, and the third wavelength is greater than or equal to 590 nm.

4. The color display device according to claim 3, wherein when the wavelength of visible light ranges from 510 nm to 580 nm, the transmittance of visible light in the second color material is less than 10%.

5. The color display device according to claim 1, wherein when the wavelength of visible light is a fourth wavelength, transmittance of visible light in the third color material is 50%, wherein the fourth wavelength is greater than or equal to 500 nm.

6. The color display device according to claim 5, wherein when the wavelength of visible light is less than 460 nm, the transmittance of visible light in the third color material is less than 10%.

7. The color display device according to claim 1, wherein the two kinds of the color materials of one of the filter elements formed by two kinds of the color materials of different colors are randomly mixed and distributed.

8. The color display device according to claim 7, wherein at least some of the filter elements are formed by one of the first filter sub-region or the second filter sub-regions, and at least some of the filter elements are formed by both the first filter sub-region and the second filter sub-region.

9. The color display device according to claim 1, wherein the two kinds of the color materials of one of the filter elements formed by two kinds of the color materials of different colors are disposed in an upper layer and a lower layer, respectively.

10. The color display device according to claim 1, wherein the color filter array is formed by a first filter layer and a second filter layer disposed above the first filter layer, wherein the first filter layer comprises a plurality of first filter sub-regions, the first filter sub-regions are divided into a plurality of groups of different colors, the first filter sub-regions of each of the groups are formed by one of the color materials, there is a first interval between two adjacent first filter sub-regions in a direction in which the pixel sub-structures are disposed, the first interval corresponds to a pixel sub-structure disposed in the direction, the second filter layer comprises a plurality of second filter sub-regions, the second filter sub-regions are divided into a plurality of groups of different colors, the second filter sub-regions of each of the groups are formed by one of the color materials, the second filter sub-regions are overlapped with part of the first filter sub-regions, there is a second interval between two adjacent second filter sub-regions in the direction in which the pixel sub-structures are disposed, the second interval corresponds to a pixel sub-structure disposed in the direction, and the second interval and the first interval are disposed in a staggered manner.

11. The color display device according to claim 1, wherein the display medium layer is an electrophoretic display material layer.

12. A color filter array substrate, comprising:
a substrate; and
a color filter array disposed on the substrate and formed by a plurality of color materials of different colors, wherein the color filter array comprises a plurality of filter elements, and at least some of the filter elements are formed by two kinds of the color materials of different colors, wherein the color materials of different colors at least comprise one of a first color material, a second color material, and a third color material, when a wavelength of visible light is a first wavelength, transmittance of the visible light in the first color material is 50%, wherein the first wavelength is less than or equal to 530 nm, and when the wavelength of visible light is greater than 580 nm, the transmittance of the visible light in the first color material is less than 10%.

\* \* \* \* \*